P. SCHICKERT.
ATTACHMENT OF THIN WALLED HOLLOW BODIES TO PLATES.
APPLICATION FILED JAN. 21, 1911.

993,883.

Patented May 30, 1911.

Witnesses
J. M. Hynkoop.
Ida T. Stanley.

Inventor
Paul Schickert,
By Knight Bros
Attorneys.

ated Unit# UNITED STATES PATENT OFFICE.

PAUL SCHICKERT, OF ESSEN-ON-THE-RUHR, GERMANY, ASSIGNOR TO FRIED. KRUPP AKTIENGESELLSCHAFT, OF ESSEN-ON-THE-RUHR, GERMANY.

ATTACHMENT OF THIN-WALLED HOLLOW BODIES TO PLATES.

993,883.  Specification of Letters Patent.  Patented May 30, 1911.

Application filed January 21, 1911. Serial No. 603,923.

*To all whom it may concern:*

Be it known that I, PAUL SCHICKERT, a subject of the Emperor of Germany, and a resident of Essen-on-the-Ruhr, Germany, have invented certain new and useful Improvements in the Attachment of Thin-Walled Hollow Bodies to Plates, of which the following is a specification.

This invention relates to the attachment of thin-walled hollow bodies to plates, which takes place in such a manner that an annular support, the thickness of whose walls corresponds as closely as possible to that of the thin-walled hollow body, is constructed on the plate by striking up the material of the plate, and then the thin-walled hollow body is connected to this support by welding.

The invention resides in the treatment of plates whose thickness considerably exceeds that of the thin-walled hollow body to be attached, and consists in reducing, prior to striking up the support, the thickness of that portion of the plate involved in forming the annular support, so that it will correspond, in wall thickness, to the thin-walled hollow body.

Figure 1:
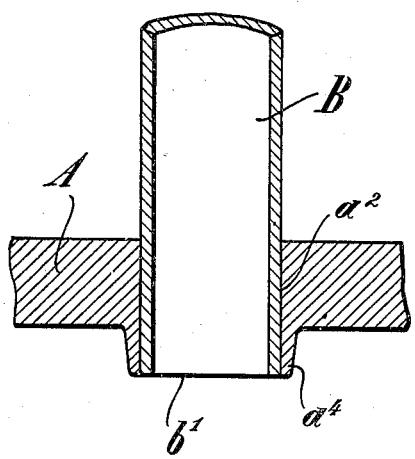
Figure 2:
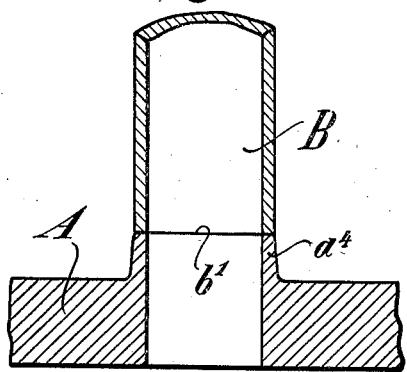
Figure 3:
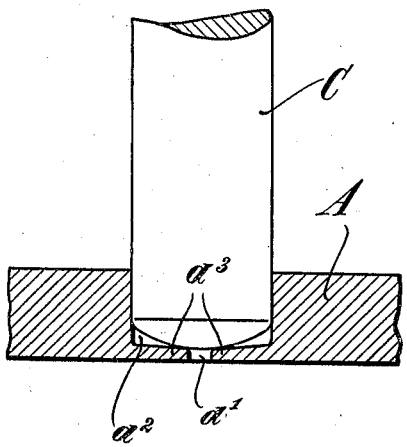
Figure 4:
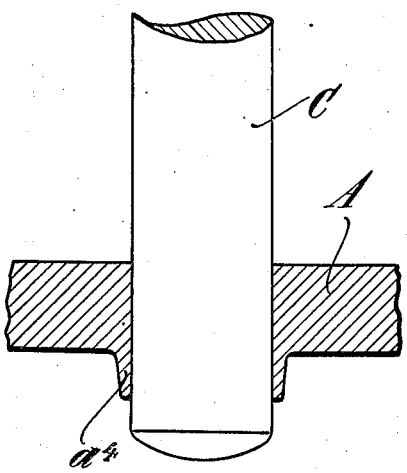

In the accompanying drawings, Figures 1 and 2 each show alternative methods of attaching thin-walled tubes to pipe plates in accordance with the present method; and Figs. 3 and 4 illustrate the production of the annular support.

After first boring into the pipe wall A, as suggested in Fig. 3, an opening $a^1$ whose diameter is considerably smaller than the diameter of the tube B, the bore $a^2$ corresponding to the tube diameter, is produced. The bore $a^2$, however, is only continued such a distance as will leave remaining a portion $a^3$ (Fig. 3) of the thickness of the pipe wall A, whose thickness corresponds to that of the annular support $a^4$ to be produced This remaining portion $a^3$ is then pressed out by means of a punch C, in the manner suggested in Fig. 4, whereby the annular support $a^4$ is formed. The diameter of the bore $a^2$ until its end terminates flush with either the external, or the internal diameter of the tube B. In the first case, the tube, as shown in Fig. 1, will be forced into the bore $a^2$ until its end terminates flush with the end of the annular support $a^4$. In the latter case, the tube will be placed with its end $b^1$ against the end of the annular support $a^4$. In both cases, the tube is adapted to be connected with the support $a^4$, without difficulty, through means, for example, of the autogenic welding process. A direct autogenic welding of the tube with the pipe wall A is not attainable because with the large mass of the pipe wall, the heat conductivity is so considerable that the material of the tube would begin to flow before the pipe wall could be brought to the welding heat. This difficulty is circumvented by the method constituting the subject of the present invention, since the tube ends and the annular supports $a^4$, because of their possessing approximately equal thickness, will attain welding heat simultaneously.

The described method is particularly suitable for attaching tubes to steam boiler walls. In the method heretofore practiced of securing the tubes by spinning or expanding, the tubes readily became loose, in consequence of the change of form resulting from variations in temperature. This is altogether precluded by the employment of the described method, in consequence of the welding of the tube with the boiler wall.

I claim:—

1. The process of securing thin-walled hollow bodies to plates of relatively thicker metal, which consists in boring the plate at the point of attachment, to reduce its thickness to substantially that of the tube to be attached and then pressing out the metal so reduced to provide a support substantially corresponding to the diameter of the tube to be attached and then welding the tube to the said support.

2. The process of securing thin-walled hollow bodies to plates of relatively thicker metal, which consists in boring the plate at the point of attachment, to reduce its thickness to substantially that of the tube to be attached and then pressing out the metal so reduced to provide a support substantially corresponding to the diameter of the tube to be attached and then securing the tube to said support by autogenic welding.

3. The process of securing thin-walled tubes to walls of relatively thicker metal, which consists in boring the thicker wall at a diameter corresponding to the external diameter of the tube to be attached, and until the remaining thickness of the wall is reduced to a thickness substantially corresponding to that of the tube to be attached, then pressing out said reduced wall to provide an annular support whose internal diameter corresponds to the external diameter of the tube and whose thickness substantially equals that of the tube and then welding the tube to the support so produced.

4. The process of securing thin-walled metallic tubes to relatively thicker plates, which consists in forming a bore through the plate, then forming a larger bore corresponding in diameter to the diameter of the tube to be attached, but extending only sufficient to leave a reduced wall of the plate corresponding in thickness to that of the tube to be attached, then pressing out said reduced wall to provide an annular support substantially corresponding in thickness to that of the tube to be attached and then welding the tube to said annular support.

The foregoing specification signed at Barmen, Germany, this 6th day of January, 1911.

PAUL SCHICKERT. [L. S.]

In presence of—
 CHAS. J. WRIGHT,
 WALTER VONNEGUT.